(No Model.)
E. F. OSBORNE.
ADJUSTABLE ACTUATOR FOR REGISTERS.
No. 265,696. Patented Oct. 10, 1882.
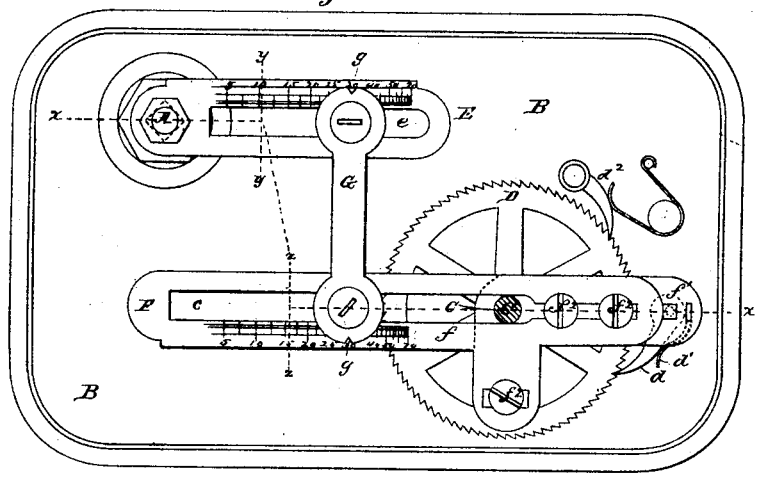
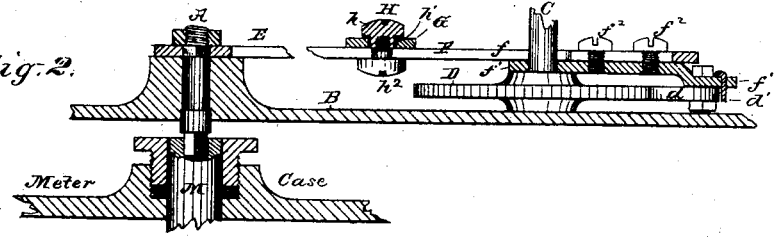
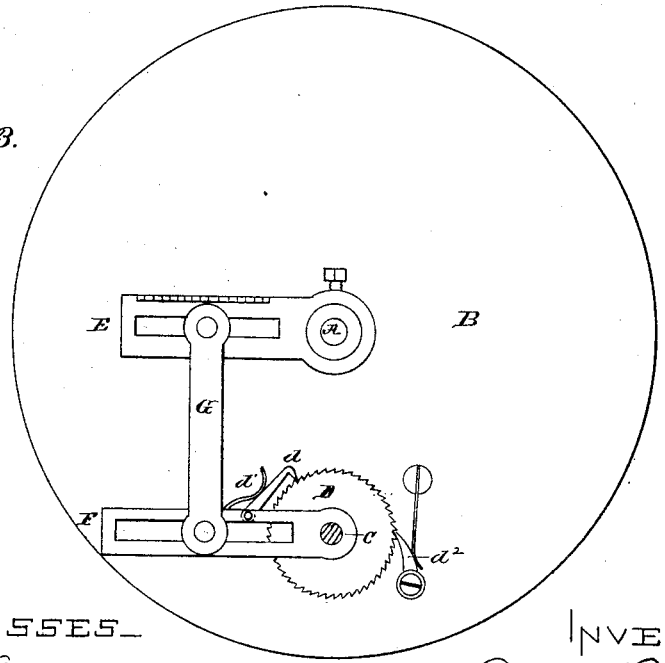
WITNESSES
F. W. Adams
W. D. Adams
INVENTOR
Eugene F. Osborne
per W. D. Dayton
Attorney

UNITED STATES PATENT OFFICE.

EUGENE F. OSBORNE, OF ST. PAUL, MINNESOTA.

ADJUSTABLE ACTUATOR FOR REGISTERS.

SPECIFICATION forming part of Letters Patent No. 265,696, dated October 10, 1882.

Application filed February 20, 1882. (No model.)

*To all whom it may concern:*

Be it known that I, EUGENE F. OSBORNE, of St. Paul, in the county of Ramsey and State of Minnesota, have invented certain new and useful Improvements in Registering Mechanism for Meters and other Apparatus; and I do hereby declare that the following is a full, clear, and exact description thereof, reference being had to the accompanying drawings, and to the letters of reference marked thereon, which form a part of this specification.

This invention relates to adjustable means for transmitting motion from a fluid-meter to a register, whereby the relative movements of the meter and those of the register actuated by the meter may be varied at will. Adjustment of such meters has heretofore consisted in means for bringing the register to indicate the volume of displacement or some constant value based thereon—in other words, for merely "bringing the meter and register together." This is not the adjustment which constitutes the principal object of this invention; but a novel means for such adjustment is herein shown and claimed.

The invention herein set forth has been devised with more especial reference to use in connection with meters for measuring the water of condensation flowing from steam-heating apparatus, and with a view of denoting the value in dollars and cents of heat imparted in such apparatus. It will be desirable to change the registration according to varying conditions—as, for example, the difference in the price of coal at different points or in different seasons; and the object of the invention is to provide means for changing the movement of the register at will, so that it may be made to denote the value desired.

A preferred form of the invention is here shown in connection with a rod or shaft supposed to belong to a meter and having an oscillating motion, such a form of motion being obtainable from either a rotary, a reciprocating, or an oscillating meter. The invention is, however, capable of application to a rotary meter without the intervention of an oscillating part.

In the drawings, Figure 1 represents the base-plate of a register-case supposed to contain the necessary train of gear-wheels and other features needful to the particular purpose in view, only the driving-wheel of such gears, however, being shown. Fig. 2 shows a section of the parts contained in Fig. 1 in the indirect line $x$ $x$ of Fig. 1, revealing the actuating oscillating shaft and other features of construction, the levers being broken off at $y$ $y$ $z$ $z$. Fig. 3 is an elevation of the back plate of a circular register, showing an alternative but less desirable arrangement of the meter and register-levers.

A is an oscillating shaft belonging to or actuated from a meter or other apparatus whose movements or their effects it is desired to denote by the register. B is the lower or back plate of the register-case, through which the shaft A works.

C is the main or driving shaft of the register gear mechanism, having its axis parallel with that of the shaft A, and provided with the ratchet-wheel D.

E is a centrally-slotted arm affixed to the oscillating shaft A, and arranged to vibrate in a plane at right angles with the axis of motion.

F is a similar slotted arm mounted loosely on the shaft C, and arranged in the same or nearly the same plane with the arm E, and parallel therewith when the latter is at mid-stroke. The arm F is shown adjacent to the ratchet-wheel D, and is provided with a pawl, $d$, which engages the ratchet, as shown in Fig. 1, being thrown into engagement by the spring $d'$. A spring detent-pawl, $d^2$, is pivoted to the plate B, and also engages the ratchet D, as shown. A vibrating movement of the arm or lever F will therefore give to the shaft C an intermittent rotary motion. In order to obtain such vibrating movement of the lever F from the vibrating lever E, a bar, G, is pivotally connected with both said levers.

H is a suitable form of pivotal fastening or clamping nut, which serves to secure the ends of the bar to the several levers E and F at any point in their central slots, $e$ and $c$, and at the same time to allow said bar to turn freely at its points of attachment. The shank $h'$ of the part $h$ is fitted to turn freely in the bar G, and is slightly longer than the thickness of said bar and greater in diameter than the width of the slot. It is tapped to admit the screw $h^2$, whose shank is of the same diameter as the slot, and which serves to bind the part $h$ firmly to the lever at any desired point. The bar G is of such length that the levers E and F are parallel at mid-stroke. Having reference to the arrangement of these levers shown in Fig. 1, the bar G should stand substantially at right angles with the levers when in this parallel position, which is a matter of original construction. The degree of rotation given to the shaft C at each stroke of the lever E will obviously depend upon the distance at which the connecting-bar G is placed from the axis of motion in said lever E. Thus, if it be desired to lower the registration, the bar G will be set nearer the shaft A, and if to increase it said bar will be set farther away from said shaft. For the purpose of "bringing the register and meter together" with reference to inequalities in construction, the lever F is made in two parts, $f$ and $f'$, the latter being permanent in position as to the shaft C, while the former, or $f$, is adjustable thereon by means of the screws $f^2$.

The lever E is graduated outward from the shaft A, and the lever F is graduated inward from its free extremity, as shown, and both levers are marked with a series of figures corresponding with prices chargeable for a quantity of heat due to the production of a given quantity of water by condensation, (under known conditions.) The levers being properly graduated and the meter and register "brought together," when it is desired to set the register to record on the basis of a given price for an adopted unit the notches $g$ $g$ on bar G are set on the lines numbered with the corresponding price-figures.

The arrangement shown in Fig. 3, in which the levers extend in the same direction, is practicable, but less desirable, because the variation in the register is effected only by setting the connecting-bar G obliquely. The meter and register will be "brought together" by first setting one end of the bar G in a permanent position, and the variation for different prices will be effected by changing the position of the opposite end of said bar.

As will be seen by reference to Fig. 2, the shaft A is practically an extension of the shaft M, which is supposed in the foregoing description to be an oscillating shaft of a meter or other apparatus whose movements it is desired to record, said shaft A having its lower squared end set in a corresponding socket of the shaft M. This form of connection permits the register to be detached from the meter readily for repairs or adjustment. In case the shaft M rotates the same general form of levers E and F and connecting-bar G may be employed; but the said bar should obviously in that case connect with the lever F at a point nearly opposite the shaft A. The lever E (in the supposed case a crank-arm) may be of such length as to sweep within the lever F, or it may be arranged to sweep below it.

While the adjustable devices described for giving a variable motion to the register from a given motion of the shaft A is above more particularly described with reference to a meter, I wish it to be understood that said devices are equally applicable to other apparatus, and that my claims are not restricted to meter-registers.

I claim as my invention—

1. In a register connecting mechanism, the combination of the actuating-shaft A, having a lever, E, the axially-fixed register-shaft C, provided with a ratchet, D, the lever F, fulcrumed on shaft C and provided with a pawl engaging with the ratchet, and the bar G, pivotally and movably connected with the levers E and F, substantially as described, and for the purposes set forth.

2. In an adjustable register connecting mechanism, substantially as shown, the combination, with the ratchet D and its shaft, of the pawl-lever composed of the pawl bearing part $f'$, having permanent relation to the ratchet bearing shaft, and the longitudinally-movable part $f$, substantially as described.

3. In a register for registering in units of money value, the adjustable devices described for transmitting variable motion from the meter to the register, consisting of the levers E and F and pivoted connecting-bar G, said levers being graduated in opposite directions from their several axes of motion, whereby the bar G may be set to give the required registration, substantially as described.

In testimony that I claim the foregoing as my invention I affix my signature in presence of two witnesses.

EUGENE F. OSBORNE.

Witnesses:
 M. E. DAYTON,
 THEO. BURKHARD.